United States Patent [19]

Conn

[11] Patent Number: 4,932,606
[45] Date of Patent: Jun. 12, 1990

[54] HOT AIR RESCUE BALLOON

[76] Inventor: Sidney H. Conn, 139 N. Mulberry St., Statesville, N.C. 28677

[21] Appl. No.: 192,189

[22] Filed: May 10, 1988

[51] Int. Cl.⁵ .............................................. B64B 1/50
[52] U.S. Cl. ..................................... 244/33; 244/31; 244/96; 244/93; 244/127; 182/142
[58] Field of Search ....................... 244/31, 33, 96, 97, 244/93, 127, 24; 182/150, 142, 82

[56] References Cited

U.S. PATENT DOCUMENTS

| | | | |
|---|---|---|---|
| 1,023,759 | 4/1912 | Rectenwald | 244/31 |
| 1,866,079 | 7/1932 | Blondin | 244/31 |
| 3,393,769 | 7/1968 | Springer | 244/33 |
| 4,076,188 | 2/1978 | Obermoller | 244/98 |
| 4,084,771 | 4/1978 | Creuzet | 244/31 |
| 4,332,547 | 6/1982 | MacDonald, Jr. | 244/31 |
| 4,421,204 | 12/1983 | Lawrence | 244/33 |
| 4,457,477 | 7/1984 | Regipa | 244/31 |

*Primary Examiner*—Joseph F. Peters, Jr.
*Assistant Examiner*—Anne Sartelle
*Attorney, Agent, or Firm*—W. Thad Adams, III

[57] ABSTRACT

A rescue balloon for rescuing individuals from high places such as towers and buildings includes an enclosed envelope for holding heated air under substantially greater than atmospheric pressure with a burner contained within the enclosed envelope for burning a combustible gas to generate sufficient heated air under pressure in the envelope to provide lift to the balloon. A rescue compartment is carried by the envelope for accommodating rescued individuals and a tether is provided for guiding the balloon as necessary to effect rescues. The balloon includes a porous blast shield positioned within the envelope to prevent direct contact between the envelope and the flame of the burner. The blast shield comprises an upright cylinder supported and secured in fixed relation within the envelope by a plurality of catenaries attached to the blast shield and to the inner walls of the envelope around its perimeter. The burn super-pressurizes the heated air within the envelope.

7 Claims, 4 Drawing Sheets

HOT AIR RESCUE BALLOON

TECHNICAL FIELD AND BACKGROUND OF THE INVENTION

This invention relates to a hot air rescue balloon which is particularly intended for use in rescuing individuals from tall structures such as buildings and towers. The rescue balloon is characterized by being compact when not inflated, easy to transport and quick to inflate and use. The balloon is stable, will carry a substantial amount of weight and is easily maneuvered when in use.

As structures are designed to be taller and taller, conventional rescue methods become impractical. Nets are essentially useless for rescue at heights above 100 ft. Ropes and ladders are in and of themselves dangerous and difficult to use, especially by very young and older persons. Fire truck extension ladders are also limited to relatively low heights—certainly only a small fraction of the height of modern skyscrapers and radio and television towers. A need exists for a rescue device which is usable by fire departments and rescue squads in a wide variety of circumstances to rescue individuals from great heights. To be practical, the rescue device must be affordable, relatively easy to use, adaptable to a wide variety of circumstances and quickly put into use. This invention relates to a new type of hot air balloon which achieves these goals.

SUMMARY OF THE INVENTION

Therefore, it is an object of the invention to provide a rescue balloon which is compact and easy to transport.

It is another object of the invention to provide a rescue balloon which is usable in a wide variety of circumstances.

It is another object of the invention to provide a rescue balloon which carries a substantial amount of weight and is manueverable.

These and other objects of the present invention are achieved in the preferred embodiments disclosed below by providing a rescue balloon for rescuing individuals from high places such as towers and buildings, and comprising an enclosed envelope for holding heated air under substantially greater than atmospheric pressure. A burner is contained within the enclosed envelope for burning a combustible gas to generate sufficient heated air under pressure in the envelope to provide lift to the balloon. A rescue compartment is carried by the envelope for accommodating rescued individuals and a tether is used to guide the balloon as necessary to effect rescues.

Preferably, the balloon envelope is substantially quadralinear in horizontal cross-section to present a flat face adjacent to a flat face of a building to facilitate the rescue along a substantial vertical and horizontal surface area of the building.

According to one preferred embodiment of the invention, the balloon includes a porous blast shield within the envelope to protect the envelope itself from direct contact with the flame of the burner and fuel tanks for supplying the burner.

According to one preferred embodiment of the invention, the rescue compartment comprises a compartment carried by the bottom of the envelope below the burner and includes an entrance to the outside of the envelope for ingress and egress.

According to another preferred embodiment of the invention, the balloon includes a porous blast shield positioned within the envelope to prevent direct contact between the envelope and the flame of the burner. The blast shield comprises an upright porous cylinder supported and secured in fixed relation within the envelope by a plurality of catenaries attached to the blast shield and to the inner walls of the envelope around the perimeter thereof.

The balloon includes a blower fan for super-pressurizing the heated air within the envelope.

According to one preferred embodiment of the invention, the rescue balloon includes fuel supply tanks positioned within the envelope for supplying fuel to the burner and a cantilever beam positioned in the envelope for counterbalancing the load in the balloon as the load varies according to the number and position of rescued individuals on the balloon and the amount of fuel consumed. The cantilever beam is positioned within the envelope with the fuel supply means mounted on the beam and moveable thereon and means for moving the fuel supply means along the beam in response to changes in the balance of the envelope.

Preferably, the tether comprises at least two cables connected by one end to the envelope and positioned at spaced-apart points on an anchoring surface, and winching means for independently controlling the length of the cables to selectively position the balloon at predetermined positions.

Preferably, the invention also includes means for holding the balloon against the surface of the building during rescue operations.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
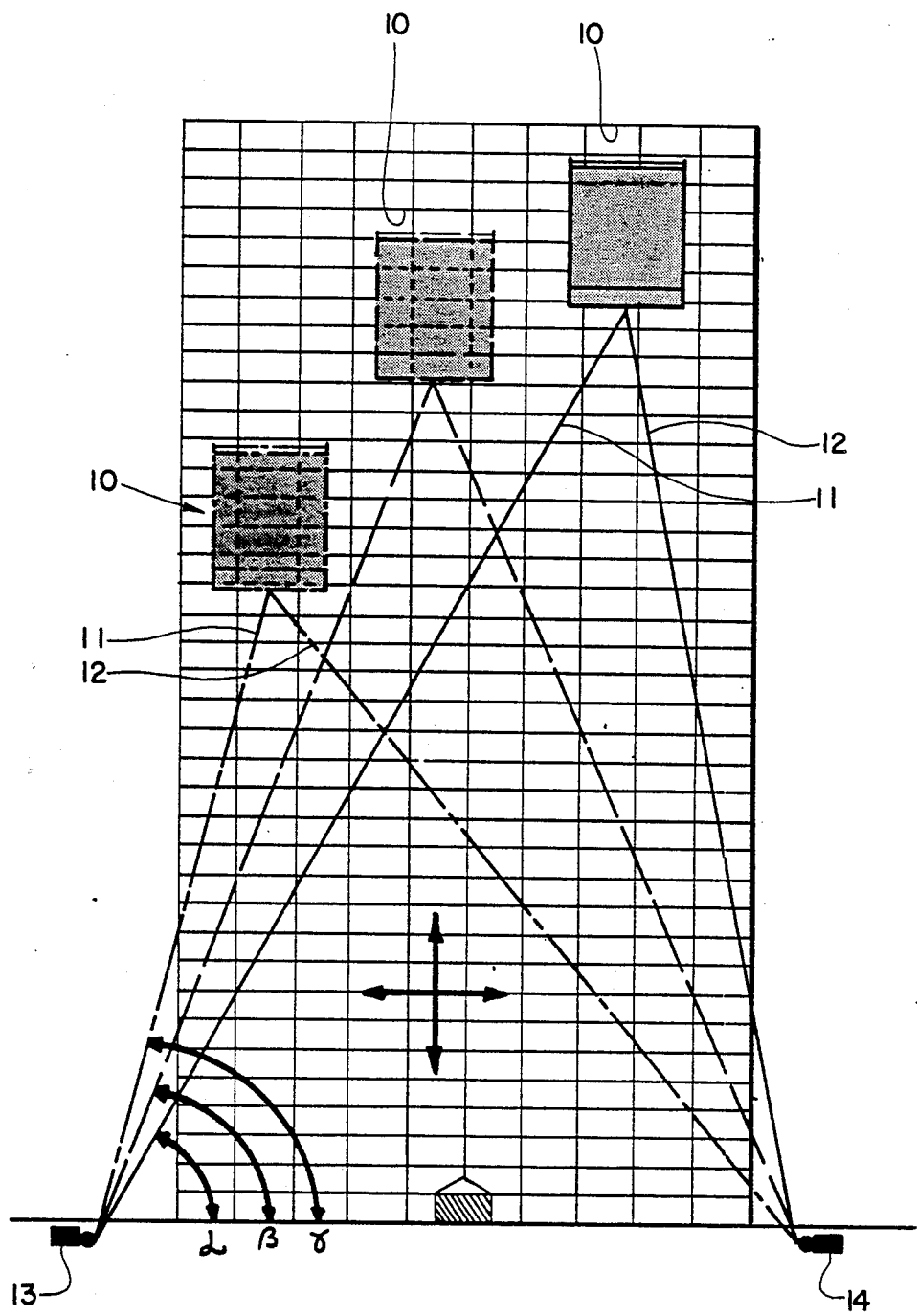
FIG. 1 is a schematic elevation of a tall building with a rescue balloon according to the invention being maneuvered along its face.

Referring now specifically to the drawings, a hot air rescue balloon according to the present invention is illustrated in FIG. 1 and shown generally at reference numeral 10. Before describing in detail the design and construction of the balloon 10, in general mode of operation will be described. As is shown in FIG. 1, the balloon 10 is intended to be used to rescue individuals from tall buildings and other structures. The balloon is maneuvered adjacent to a building and then is moved along the side of the building being controlled by cables. In the embodiment shown in FIG. 1, a pair of cables 11, 12 are controlled by winches 13, 14 which are positioned in spaced-apart relation on the ground. Movement of the balloon to a desired location can be controlled by differential, independent control of the length of the cables 11, 12. This type of control permits movement of the balloon 10 to any point on the face of the building without movement of the winches 13, 14 or other support equipment on the ground. This is particularly important in situations such as fires, where movement around the base of the building may be hindered by the presence of other equipment or by debris.

The balloon is delivered to the site in an uninflated form. Typically, it Will be stored on a vehicle operated by a fire department or rescue squad. Once use is completed, the balloon is deflated, cleaned, repaired if needed, replenished with fuel and stored for its next use.

Figure 2:
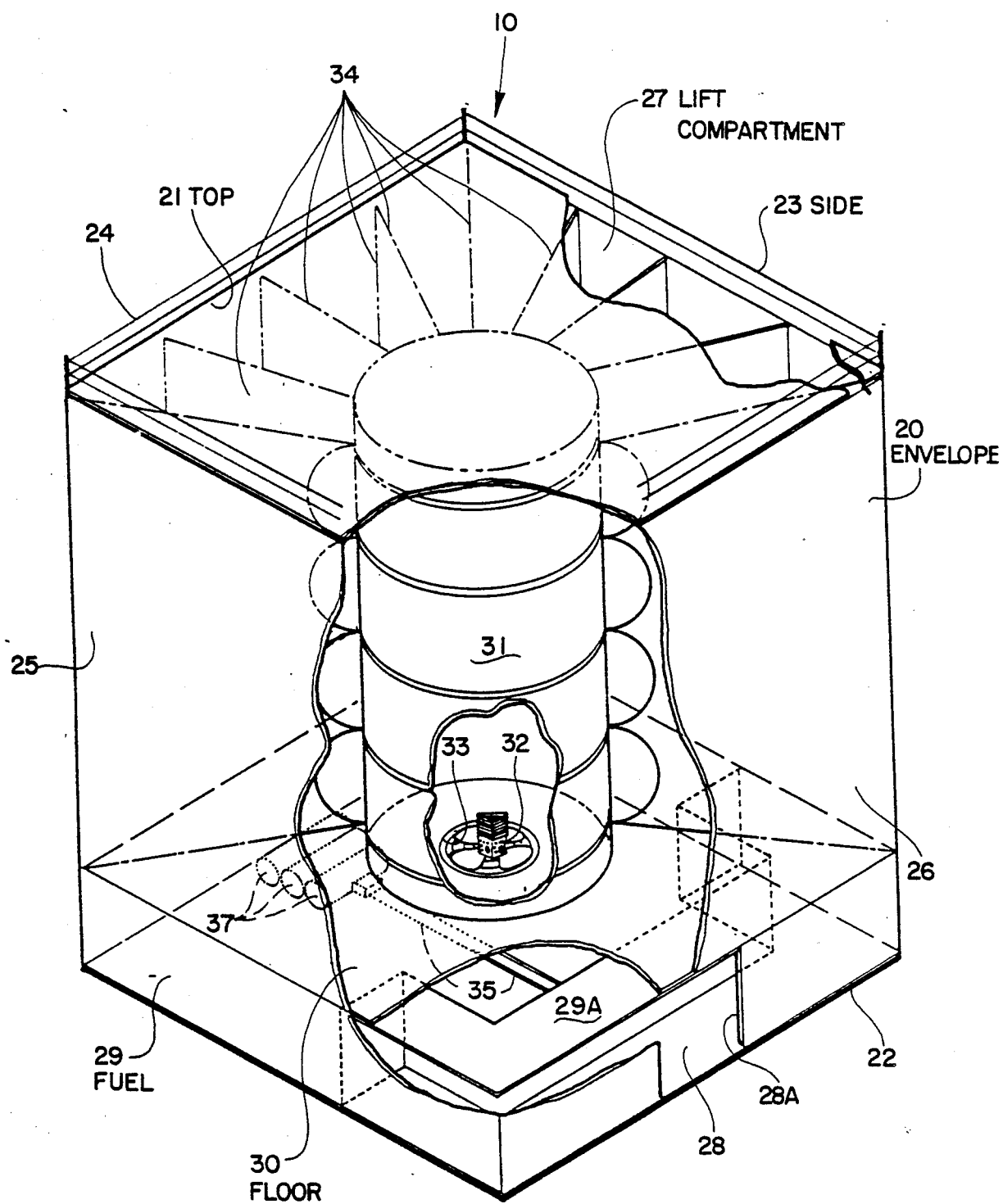
FIG. 2 is a fragmentary perspective view, with parts broken away, of the rescue balloon.
Figure 3:
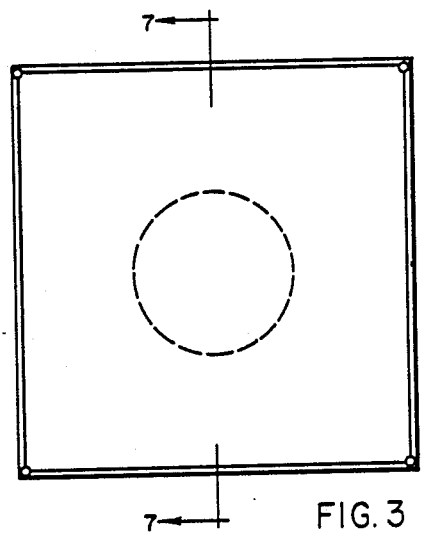
FIG. 3 is a schematic horizontal cross-sectional view of the balloon through the midsection of the balloon.
Figure 4:
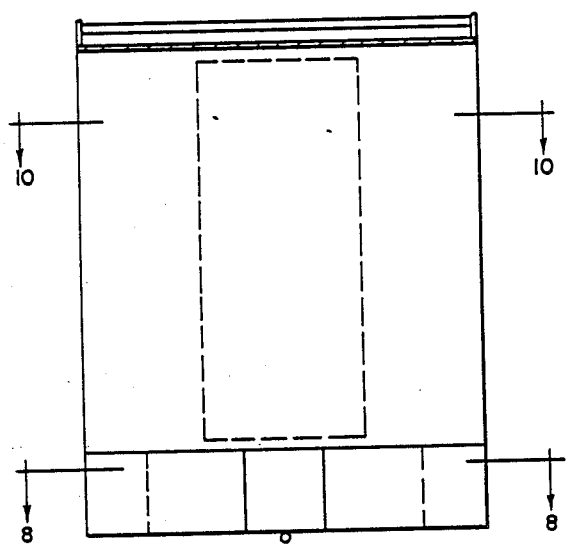
FIG. 4 is a schematic vertical cross-sectional view of the balloon through the midsection of the balloon.
Figure 6:
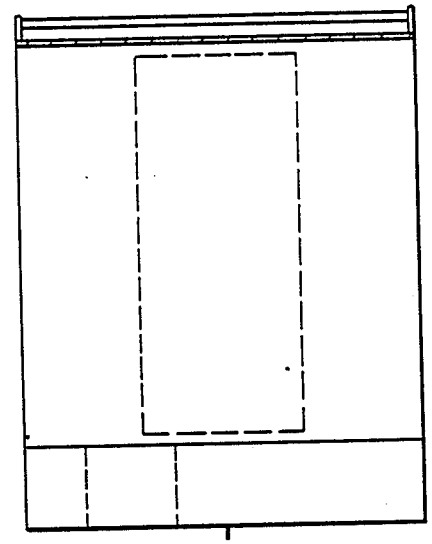
FIG. 6 is a schematic vertical cross-sectional view of the balloon through the midsection at 90° to the cross-section of FIG. 4.
Figure 5:
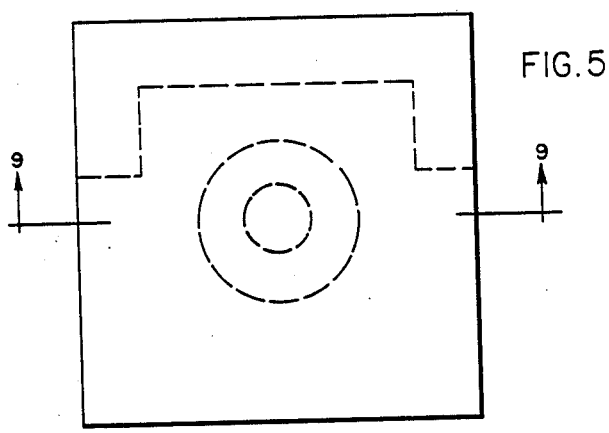
FIG. 5 is a schematic horizontal cross-sectional view of the balloon through the passenger compartment and burner sections.
Figure 11:
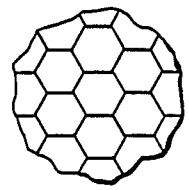
FIG. 11 is an enlarged, fragmentary view of the honeycomb Kevlar material used as the flooring, top and bottom of the balloon.

Referring now more specifically to the structure of the balloon 10, FIG. 2 illustrates the overall construction. As is shown, the balloon 10 is formed of an envelope 20 constructed in a square shape to define a rectangular structure having a top 21, a bottom 22 and four sides 23, 24 25 and 26. Of course, other shapes are possible, but the rectangular shape provides a good balance between air capacity, stability, lifting capability and compactness. The flat sides 23, 24, 25 and 26 are ideal for fitting flush against the flat wall of a building. A suitable size for the balloon is approximately 9-10 meters on a side and 12-14 meters high. The envelope is constructed of a Kevlar type of nonflammable aramid fiber and may include double thickness walls or preferably may be constructed of a 2-3 cm thick honeycomb material (see FIG. 11) which provides resistance to flame and heat, and also insulation to reduce heat loss through the envelope to the environment.

Referring still to FIG. 2, envelope 20 is divided into three main compartments. The largest compartment is the lift compartment 27, which is divided from a rescue compartment 28 and a fuel tank compartment 29 by a floor 30. The rescue compartment 28 and the fuel compartment 29 are separated by a vertical wall 29A, as is best shown in FIGS. 2, 7, 8 and 9. Ingress and egress to the rescue compartment is provided by a door opening 28A. The lift compartment 27 is about 10-12 meters high and the rescue and fuel tank compartments are 2-3 meters high. Lift compartment 27 contains an upright cylindrical blast shield 31 secured to floor 30 and surrounding a burner and pressurizing fan 32 mounted in an access hole 33 in floor 30. Blast shield is constructed of a blend of PBI or PBI/Nomex or PBI/Nomex/Kevlar fiber in a woven construction and is porous, thereby permitting free flow of air while preventing direct contact between the flame of the burner 32 and the walls of envelope 20.

Figure 10:
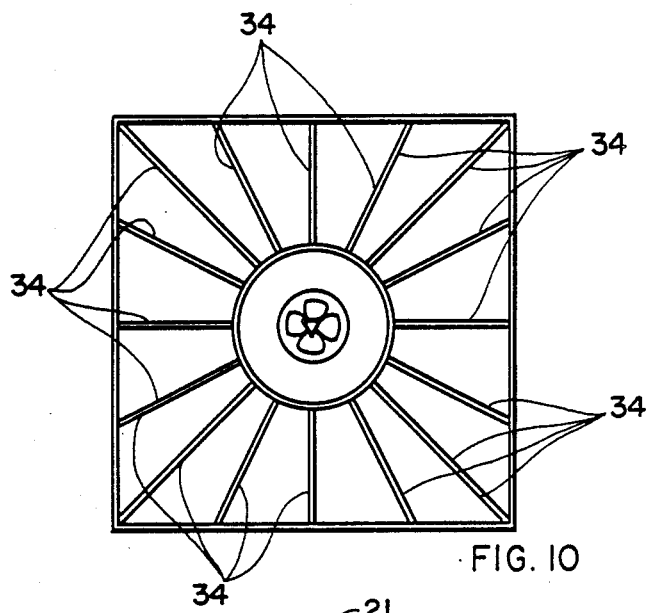
FIG. 10 is a horizontal cross-section of the balloon taken along lines 10—10 of FIG. 4.
Figures 7, 9:
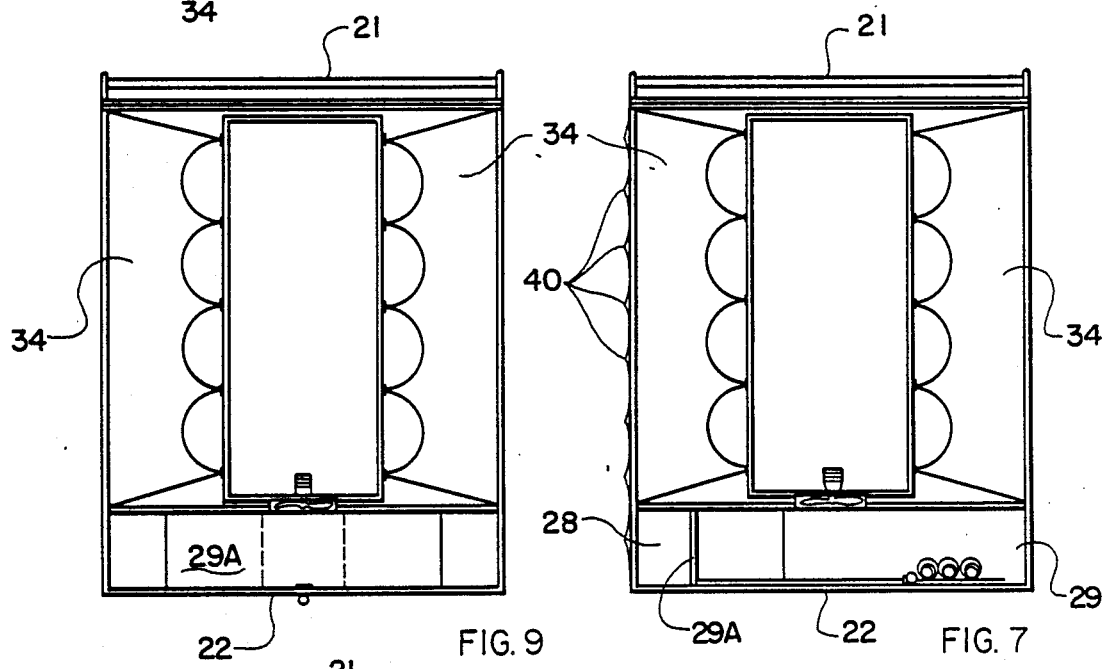
FIG. 7 is a vertical cross-section of the balloon taken along lines 7—7 of FIG. 3.
FIG. 9 is a vertical cross-section of the balloon taken along lines 9—9 of FIG. 5.

As is shown in FIG. 2 and also in FIGS. 7, 9 and 10, blast shield is secured in the proper position within lift compartment 27 by a series of catenaries 34. Catenaries 34 comprise a series of interior panels constructed of woven Nomex attached by one end to the inner walls of the envelope 20 and by the other end to blast shield 31. Note particularly in FIGS. 1, 7 and 9 that the catenaries 34 are scalloped on the end attached to blast shield 31, thereby each providing several spaced-apart attachment points which suspend the blast shield 31 without interfering unduly with air circulation. The upper extent of the blast shield 31 is spaced-apart from the top 21 of envelope 20 to further permit air flow around and between the blast shield 31 and the interior of the envelope 20.

The fuel compartment 29 occupies the major portion of the area beneath lift compartment 27. A cantilever beam 35 is positioned in fuel compartment 29 and extends outwardly from the side of the envelope 20 where the rescue compartment 28 is located towards the other side of the envelope 20. Fuel tanks 37 are mounted on beam 35 and are moveable along beam 35 from one end to the other. Beam 85 serves to permit the balloon to be properly balanced at all times and conditions. When the balloon is empty of occupants the balloon is otherwise relatively symmetrically balanced and the fuel tanks 37 are positioned on beam 35 in the approximate center of the balloon. Little movement from this position will occur as fuel is consumed, so long as the balloon is empty of occupants since the weight of the balloon decreases slightly but the balance does not change. However, as the weight in the rescue compartment increases, the weight of the balloon becomes quite asymmetrically distributed. Fuel tanks 37 are therefore moved outwardly along beam 35 away from rescue compartment 28. The increased length of the lever arm balances the weight of the balloon. As fuel is consumed in this asymmetric position, the fuel tanks are moved further outwardly along beam 35.

Figure 8:
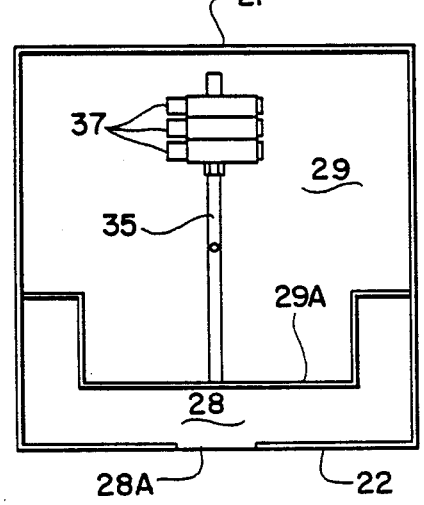
FIG. 8 is a vertical cross-section of the balloon taken along lines 8—8 of FIG. 4.

As is best shown in FIGS. 2 and 8, the rescue compartment 28 occupies a relatively small portion of the lower level of envelope 20. Nevertheless, the overall size of the area is sufficient to hold a large number (approximately 12) persons. As is apparent, the side of the envelope having the rescue compartment 28 and the door 28A is positioned closest to the building to permit access to the rescue compartment 28 from the building. Ideally, a grappling device (not shown) holds the balloon against the building. The grappling device may take many forms but can be a winch line connected to a window washing track slider, a concrete anchor, a grapple connected to a balcony, and so forth.

in addition to the rescue compartment 28, further rescue means in the form of hooks, hand holds, nets or webbing 40 can be attached to the rescue compartment side (see FIG. 7) and top of the balloon. This would provide a means for persons to get to the door 28A and also, as a last resort, further space for building occupants if the rescue compartment 28 is full or inaccessible.

Air is heated inside the envelope 20 and under pressure. This is in contrast to the usual hot air balloon where air is heated on the exterior of the envelope beneath an opening to the atmosphere and projected into the envelope by the burner. The fuel used is preferably propane gas just as is used in conventional hot air balloons. The burner is operated by suitable remote control means (not shown) and the fan drives air into the lift compartment 27. Air heated in this way can achieve a very high temperature on the order of 290–315° C. Air at this temperature in a balloon of the size described above can provide approximately 2 metric tons of lift. From cold start to full inflation occurs in approximately 10 minutes.

A hot air rescue balloon is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A rescue balloon for rescuing individuals from high places such as towers and buildings, comprising:
    (a) an enclosed envelope for holding heated air under substantially greater than atmospheric pressure;
    (b) a burner contained within said enclosed envelope for burning a combustible gas to generate sufficient heated air under pressure in said envelope to provide lift to said balloon;
    (c) rescue compartment means carried by said envelope for accommodating rescued individuals;
    (d) tether means for guiding the balloon as necessary to effect rescues; and
    (e) a porous blast shield positioned within said envelope to prevent direct contact between said envelope and the flame of said burner, and wherein said blast shield comprises an upright cylinder supported and secured in fixed relation within said envelope by a plurality of catenaries attached to said blast shield and to the inner walls of the envelope around the perimeter thereof.

2. A rescue balloon according to claim 1, wherein said balloon envelope is substantially quadralinear in horizontal cross-section to present a flat face adjacent to a flat face of a building to facilitate the simultaneous rescue along a substantial vertical and horizontal surface area of the building.

3. A rescue balloon according to claim 1, wherein said balloon includes a porous blast shield within said envelope to protect the envelope itself from direct contact with the flame of the burner.

4. A rescue balloon according to claim 1, wherein said balloon includes fuel tanks for supplying the burner.

5. A rescue balloon according to claim 1, wherein said rescue compartment means comprises a compartment carried by the bottom of the envelope below the burner and including an opening to the outside of the envelope for ingress and egress.

6. A rescue balloon according to claim 1, and including a blower fan for superpressurizing the heated air within said envelope.

7. A rescue balloon according to claim 1, wherein said tether means comprises at least two cables connected by one end to said envelope and for being positioned at spaced-apart points on an anchoring surface, and winching means for independently controlling the length of said cables to selectively position said balloon at predetermined positions.

* * * * *